US 9,906,274 B2

(12) United States Patent
Jung et al.

(10) Patent No.: US 9,906,274 B2
(45) Date of Patent: Feb. 27, 2018

(54) CORE ASSEMBLY FOR WIRELESS POWER TRANSMITTING DEVICE AND WIRELESS POWER TRANSMITTING DEVICE HAVING THE SAME

(75) Inventors: Chun-Kil Jung, Seoul (KR); Yoon-Sang Kuk, Gwancheon-si (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 919 days.

(21) Appl. No.: 13/550,201

(22) Filed: Jul. 16, 2012

(65) Prior Publication Data
US 2013/0015719 A1 Jan. 17, 2013

(30) Foreign Application Priority Data
Jul. 14, 2011 (KR) .................. 10-2011-0070145

(51) Int. Cl.
*H04B 5/00* (2006.01)
*H02J 5/00* (2016.01)

(52) U.S. Cl.
CPC ............ *H04B 5/0037* (2013.01); *H02J 5/005* (2013.01); *H04B 5/0087* (2013.01)

(58) Field of Classification Search
CPC ....................................... H04B 5/00
USPC ....................................... 307/104
See application file for complete search history.

(56) References Cited

U.S. PATENT DOCUMENTS

| 8,912,687 | B2* | 12/2014 | Kesler et al. | 307/104 |
| 2005/0068019 | A1* | 3/2005 | Nakamura et al. | 323/355 |
| 2008/0122570 | A1* | 5/2008 | Takaishi | 336/84 M |
| 2009/0096413 | A1* | 4/2009 | Partovi et al. | 320/108 |
| 2009/0096414 | A1* | 4/2009 | Cheng et al. | 320/108 |
| 2009/0230777 | A1* | 9/2009 | Baarman et al. | 307/104 |
| 2011/0050382 | A1* | 3/2011 | Baarman et al. | 336/221 |
| 2011/0095618 | A1* | 4/2011 | Schatz et al. | 307/104 |
| 2011/0140653 | A1* | 6/2011 | Jung et al. | 320/108 |
| 2012/0098486 | A1* | 4/2012 | Jung | 320/108 |
| 2012/0139356 | A1* | 6/2012 | Jung et al. | 307/104 |
| 2012/0161535 | A1* | 6/2012 | Jung et al. | 307/104 |

(Continued)

FOREIGN PATENT DOCUMENTS

| CN | 10191939 A | 12/2010 |
| CN | 201887566 U | 6/2011 |

(Continued)

OTHER PUBLICATIONS

U.S. Appl. No. 14/074,484, filed Nov. 2013, Chun-Kil Jung, Hanrim Postech Co., Ltd.

(Continued)

*Primary Examiner* — Adi Amrany
(74) *Attorney, Agent, or Firm* — DeLizio Law, PLLC

(57) ABSTRACT

A core assembly used for a wireless power transmitting device and a wireless power transmitting device having the same. The core assembly for the wireless power transmitting device includes: a main coil disposed at a first level; an auxiliary coil disposed at a lower side of the main coil such that the auxiliary coil is located at a second level lower than the first level, and including a first sub coil and a second sub coil, which respectively have a portion overlapped with the main coil and respectively have a size smaller than the main coil; and a core of a magnetic substance configured to accommodate the main coil and the auxiliary coil.

14 Claims, 5 Drawing Sheets

(56) References Cited

U.S. PATENT DOCUMENTS

| | | | |
|---|---|---|---|
| 2012/0242276 A1* | 9/2012 | Jung | H02J 5/005 320/103 |
| 2012/0313577 A1* | 12/2012 | Moes et al. | 320/108 |
| 2013/0015718 A1* | 1/2013 | Jung et al. | 307/104 |
| 2013/0069586 A1* | 3/2013 | Jung et al. | 320/108 |
| 2013/0106198 A1* | 5/2013 | Kuk et al. | 307/104 |
| 2013/0270921 A1* | 10/2013 | Boys et al. | 307/104 |
| 2014/0070764 A1* | 3/2014 | Keeling | B60L 11/1833 320/108 |

FOREIGN PATENT DOCUMENTS

| | | | |
|---|---|---|---|
| JP | 11265814 A | * | 9/1999 |
| JP | 2004-229406 A | | 8/2004 |
| JP | 2008-120239 A | | 5/2008 |
| JP | 2009-164293 A | | 7/2009 |
| JP | 2010-527226 A | | 8/2010 |

OTHER PUBLICATIONS

Chinese Office Action dated May 6, 2015, issued to Chinese Application No. 201210244903.5.

* cited by examiner

CORE ASSEMBLY FOR WIRELESS POWER TRANSMITTING DEVICE AND WIRELESS POWER TRANSMITTING DEVICE HAVING THE SAME

CROSS-REFERENCE TO RELATED APPLICATION

This application claims the benefit of Korean Patent Application No. 10-2011-0070145, filed on Jul. 14, 2011, in the Korean Intellectual Property Office, the disclosure of which is incorporated herein by reference.

BACKGROUND OF THE INVENTION

1. Field of the Invention

The following description relates to a core assembly used for a wireless power transmitting device and a wireless power transmitting device having the same.

2. Description of the Related Art

Generally, a rechargeable secondary battery is mounted on portable electronic devices such as a mobile communication terminal and Personal Digital Assistants (PDA). An individual charging device for supplying electric energy to a battery of a portable electronic device using commercial home power sources is required for charging the battery.

As an alternative to the contact charging method, a wireless power communication system for transmitting power wirelessly to charge a battery without contact between each contact terminal of the charging device and the battery is suggested.

In the wireless power communication system, since there is no coupling between terminals, it is required to dispose a wireless power receiving device on a wireless power transmitting device at a correct position in order to maintain a predetermined charging efficiency. However, the above-mentioned requirement may not be satisfied due to user's acts or a vibration of the wireless power receiving device during charging.

SUMMARY OF THE INVENTION

While not limited thereto, an embodiment of the invention is directed to providing a core assembly for a wireless power transmitting device that minimizes deterioration of a power transmitting efficiency by providing a constituent element for increasing a freedom degree of a correct position in which the wireless power receiving device for receiving power from the wireless power transmitting device is to be disposed, and a wireless power transmitting device having the same.

According to an aspect of the invention, provided is a core assembly for a wireless power transmitting device, including: a main coil disposed at a first level; an auxiliary coil disposed at a lower side of the main coil such that the auxiliary coil is located at a second level lower than the first level, and including a first sub coil and a second sub coil, which respectively have a portion overlapped with the main coil and respectively have a size smaller than the main coil; and a core of a magnetic substance configured to accommodate the main coil and the auxiliary coil.

According to an aspect of the invention, the first sub coil and the second sub coil may be disposed to contact a lower surface of the main coil.

According to an aspect of the invention, a width of the main coil in a first direction may be longer than each width of the first sub coil and the second sub coil in the first direction.

According to an aspect of the invention, the main coil may be disposed to cover a portion of each upper surface of the first sub coil and the second sub coil and to expose a rest area excluding the covered portion.

According to an aspect of the invention, the width of the main coil in the first direction may be shorter than a sum of the widths of the first sub coil and the second sub coil in the first direction.

According to an aspect of the invention, the width of the main coil in the first direction may be 60 to 80% of the sum of the widths of the first sub coil and the second sub coil in the first direction.

According to an aspect of the invention, the width of the main toil in a second direction may be the same as each width of the first sub coil and the second sub coil in a second direction.

According to an aspect of the invention, the width of the first sub coil in the first direction may be configured to be the same as that of the second sub coil in the first direction.

According to an aspect of the invention, a line that neighboring surfaces of the first sub coil and the second sub coil meet may correspond to a line passing a center of the main coil.

According to an aspect of the invention, the second direction may be perpendicular to the first direction.

According to an aspect of the invention, the auxiliary coil may include: a base as an insulator disposed at the lower side of the main coil; and a conductive pattern disposed at a surface facing the main coil of the base to include a first conductive pattern forming the first sub coil and a second conductive pattern forming the second sub coil.

According to an aspect of the invention, a concave portion accommodating the main coil and the auxiliary coil and a side wall defining the concave portion may be formed at one surface of the core.

According to an aspect of the invention, a plurality of extension grooves, at which a passage that an end portion of the main coil and the auxiliary coil extends out of the concave portion is formed, may be configured at the side wall.

According to another aspect of the invention, provided is a wireless power transmitting device, including: a core assembly described above; and a transmitting controller for controlling transmission of a wireless power signal via the main coil and the auxiliary coil.

According to an aspect of the invention, the transmitting controller may control such that power is simultaneously applied to any one of the first sub coil and the second sub coil along with the main coil.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
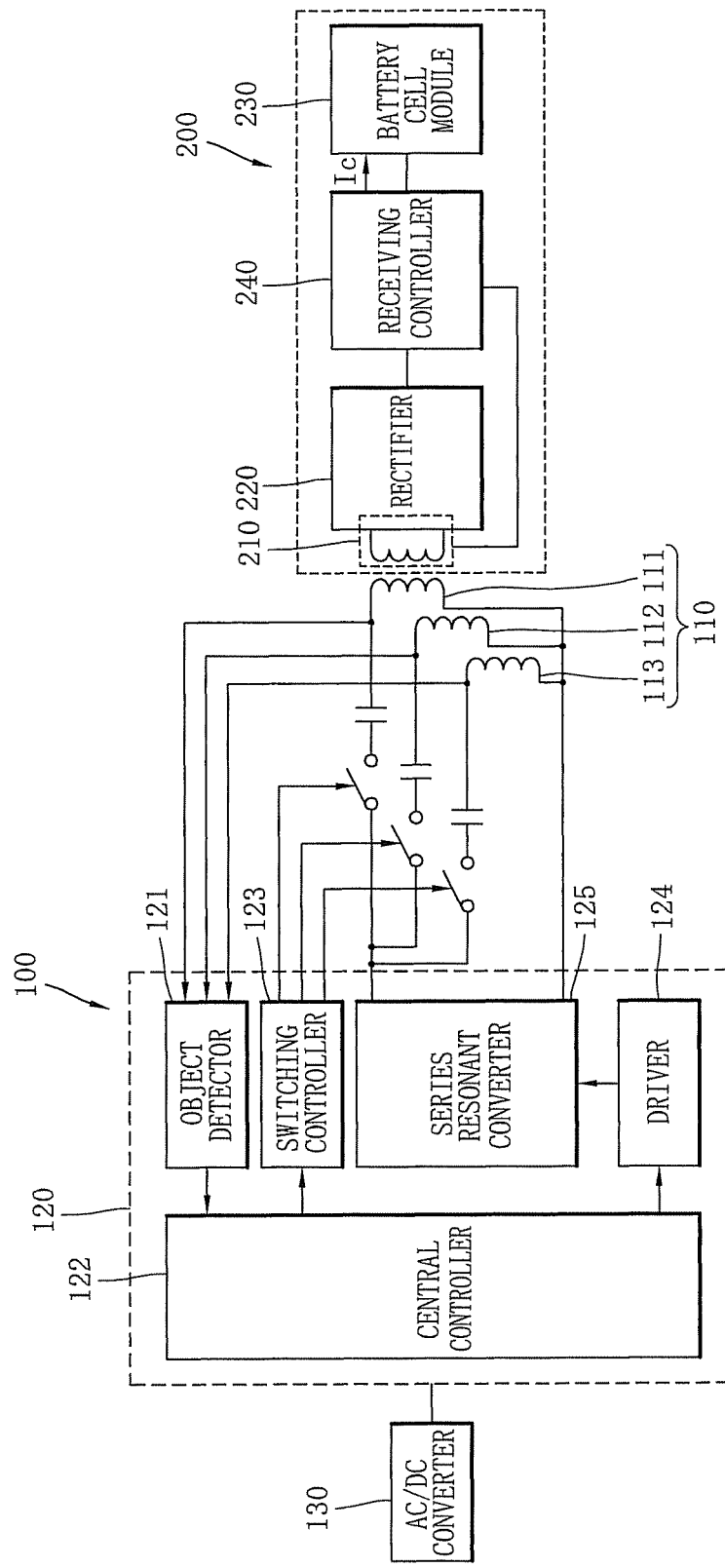
FIG. 1 is a block diagram that shows a wireless power communication system in accordance with an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a core assembly for a wireless power transmitting device and a wireless power transmitting device having the same will be described in detail with reference to the accompanying drawings. In all embodiments of this specification, the same or similar constituent elements have the same or similar reference number and the same description on the same or similar constituent elements in different exemplary embodiments will be identically applied.

FIG. 1 is a block diagram that shows a wireless power communication system in accordance with an exemplary embodiment. As shown in FIG. 1, the wireless power communication system in accordance with an exemplary embodiment includes a wireless power transmitting device 100 and a wireless power receiving device 200. According to an electromagnetic induction method, when the wireless power transmitting device 100 transmits a wireless power signal to the wireless power receiving device 200, the wireless power receiving device 200 receiving the wireless power signal charges a battery with the power of the wireless power signal or supplies power to electronic devices connected to the wireless power receiving device 200.

Hereinafter, each of configurations of the wireless power transmitting device 100 and the wireless power receiving device 200 will be described.

The wireless power transmitting device 100 according to an exemplary embodiment includes a primary coil 110, a transmitting controller 120 and an alternating current/direct current (AC/DC) converter 130. The primary coil 110 is a device for transmitting a power signal to a secondary coil 210 of the wireless power receiving device 200 according to the electromagnetic induction method. According to this exemplary embodiment, three coils including a main coil 111, a first sub coil 112 and a second sub coil 113 may be adopted as the primary coil 110. The three coils 111, 112, and 113 may be selectively operated by control of a transmitting controller 120.

With reference to FIG. 1 again, the transmitting controller 120 for controlling the primary coil 110 may include an object detector 121, a central controller 122, a switching controller 123, a driver 124 and a series resonant converter 125.

The object detector 121 detects a load change of the primary coil 110, determines whether an object detected by the corresponding load change is the wireless power receiving apparatus 200—i.e., functions as an identification (ID) checker—and filters and processes a charging state signal transmitted from the wireless power receiving apparatus 200. For example, when an ID signal as a response signal to an ID call signal transmitted via the primary coil 110 is received, the object detecting unit 121 filters and processes the ID signal. When a charging state signal including information on a battery cell or a charging voltage is received, the object detecting unit 121 filters and processes the received information.

The central controller 122 receives and checks a determination result of the object detector 121, analyzes an ID signal received via the primary coil 110, and transmits a power signal for transmitting a wireless power signal via the primary coil 110 to the driver 124. Also, when the charging state signal is received via the primary coil to be described below, the central controller 122 changes the wireless power signal by controlling the driver 124 based on the charging state signal.

The switching controller 123 controls a switching operation of a switch among the coils 111 to 113 and the series resonant converter 125.

The driver 124 controls the operation of the series resonant converter 125 by controlling the central controller 122.

The series resonant converter 125 generates transmission power for generating a power signal to be transmitted by controlling the driver 124 and supplies the transmission power to one end of the primary coil 110. In other words, when the central controller 122 transmits the power controlling signal for transmitting a power signal with a required power value to the driver 124, the driver 124 controls the operation of the series resonant converter 125 correspondingly to the transmitted power controlling signal. Also, the series resonant converter 125 applies transmission power corresponding to the required power value to the primary coil 110 by controlling the driver 124 to transmit a wireless power signal with a required strength.

In addition, the series resonant converter 125 supplies power for generating first to third object detecting signals via each of the main coil 111 and the first and second sub coils 112 and 113 by controlling of the driver 124.

The AC/DC converter 130 is a device for converting an AC power of 220V or 110V into a DC power of a predetermined voltage. As described above, an output voltage value is changed by control of the central controller 122.

The wireless power receiving apparatus 200 receiving power by receiving a power signal includes a secondary coil 210, a rectifier 220, a battery cell module 230 and a receiving controller 240. The secondary coil 210 generates induction power by the transmitted power signal. The rectifier 220 rectifies induced power. The battery cell module 230 is charged with the rectified power. The receiving controller 240 controls the secondary coil 210, the rectifier 220 and the battery cell module 230.

The secondary coil 210 is configured to receive a wireless power signal transmitted from the primary coil 110 of the wireless power transmitting device 100.

The rectifier 220 rectifies a wireless power received from the secondary coil 210 into a DC voltage, and maintains a charging state with a charging voltage before start of the charging.

The battery cell module 230 is an object to be charged by the DC power from the rectifier 220 according to the control of the receiving controller 240. Electronic appliances such as PMP, MP3, and cellular phones may be charged instead of the battery cell module 230. Meanwhile, the battery cell module 230 is configured to include protection circuits such as an over voltage and over current preventing circuit and a temperature sensing circuit. Also, a charging management module for collecting and processing the information including the charging state of the battery cell is included.

The receiving controller 240 controls the current of the power charged in the rectifier 220 such that a proper current flows into the battery cell module 230.

Hereinafter, the wireless power transmitting device 100 and a core assembly as a part of the wireless power transmitting device 100 will be described in detail with reference to FIG. 2 to FIG. 6.

Figure 2:
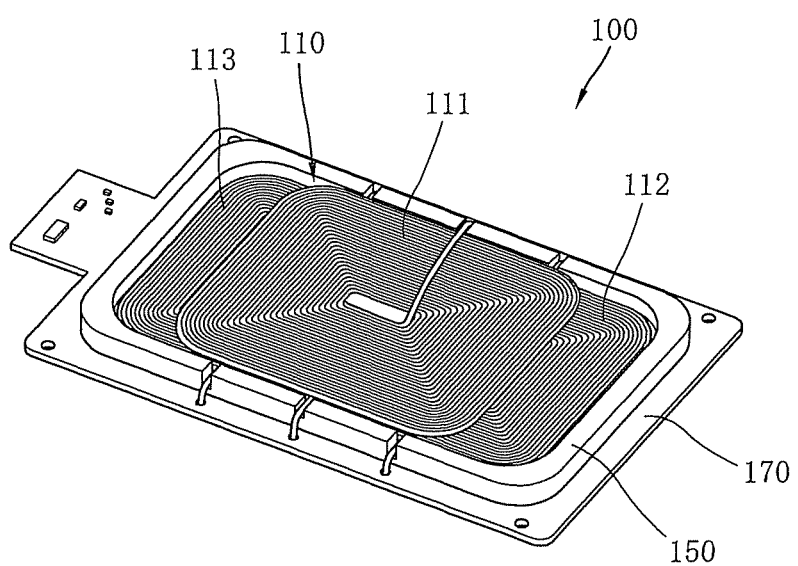
FIG. 2 is an assembled perspective view showing main elements of the wireless power transmitting device 100 in FIG. 1.

FIG. 2 is an assembled perspective view showing main elements of the wireless power transmitting device 100 in FIG. 1.

With reference to FIG. 2, the wireless power transmitting device 100 may include a primary coil 110, a core 150, and a circuit board 170. Among them, the primary coil 110 and the core 150 are included in the core assembly.

As described above, the primary coil 110 is formed of three coils including the main coil 111 and the auxiliary coils (the first sub coil 112 and the second sub coil 113). Each of the coils 111 to 113 is wound in one direction to have an oval shape, a track shape or a quadrangular shape. Although the first sub coil 112 and the second sub coil 113 have the quadrangular shape, the main coil 111 may have the track shape. In this case, the main coil 111 of the track shape increases a freedom degree at a position of the wireless power receiving device 200. The coils 111 to 113 may be formed of a Litz type according to a method that a plurality of wires are twisted. Each of the coils 111 to 113 has two end portions (see FIG. 3).

In an arrangement of the coils 111 to 113, the auxiliary coils of the first sub coil 112 and the second sub coil 113 are disposed at a lower side, and the main coil 111 is disposed at an upper side of the first sub coil 112 and the second sub coil 113. Accordingly, if the main coil 111 is disposed at a first level, the first sub coil 112 and the second sub coil 113 may be disposed at a second level, which is different from and lower than the first level. Accordingly, the main coil 111 is disposed to be closer to a charging surface, in which the wireless power receiving device 200 is disposed, among outer surfaces of the wireless power transmitting device 100 than the auxiliary coil. In this arrangement, each of the first sub coil 112 and the second sub coil 113 is partially overlapped with the main coil 111, and the overlapped portions of the coils 112 and 113 is not to be exposed to the outside. Also, since the auxiliary coils 112 and 113 are disposed to contact the lower surface of the main coil 111, a gap between the wireless power receiving device 200 and the auxiliary coils 112 and 113 is minimized.

The core 150 having a material of a magnetic substance accommodates the primary coil 110. The core 150 may be formed of a plate shape. In this exemplary embodiment, the core 150 generally has a rectangular shape. To be specific, four corners of the rectangular shape have a round-treated shape.

The circuit board 170 is disposed at a lower side of the core 150 to face a lower surface of the core 150. Since an area of the circuit board 170 is wider than that of the core 150, a part 171 of the circuit board 170 (see FIG. 3) supports the core 150 from below. Another part 173 of the circuit board 170 (see FIG. 3) includes a circuit for controlling the power that is applied to the primary coil 110. The control circuit may include the transmitting controller 120 and the AC/DC converter 130 (see FIG. 1) described above. Further, at least one shield layer and insulating layer may be included in the circuit board 170 and the core 150. The shield layer and the insulating layer reduce a possibility that the magnetic field generated in the primary coil 110 affects the circuit board 170.

Figure 3:
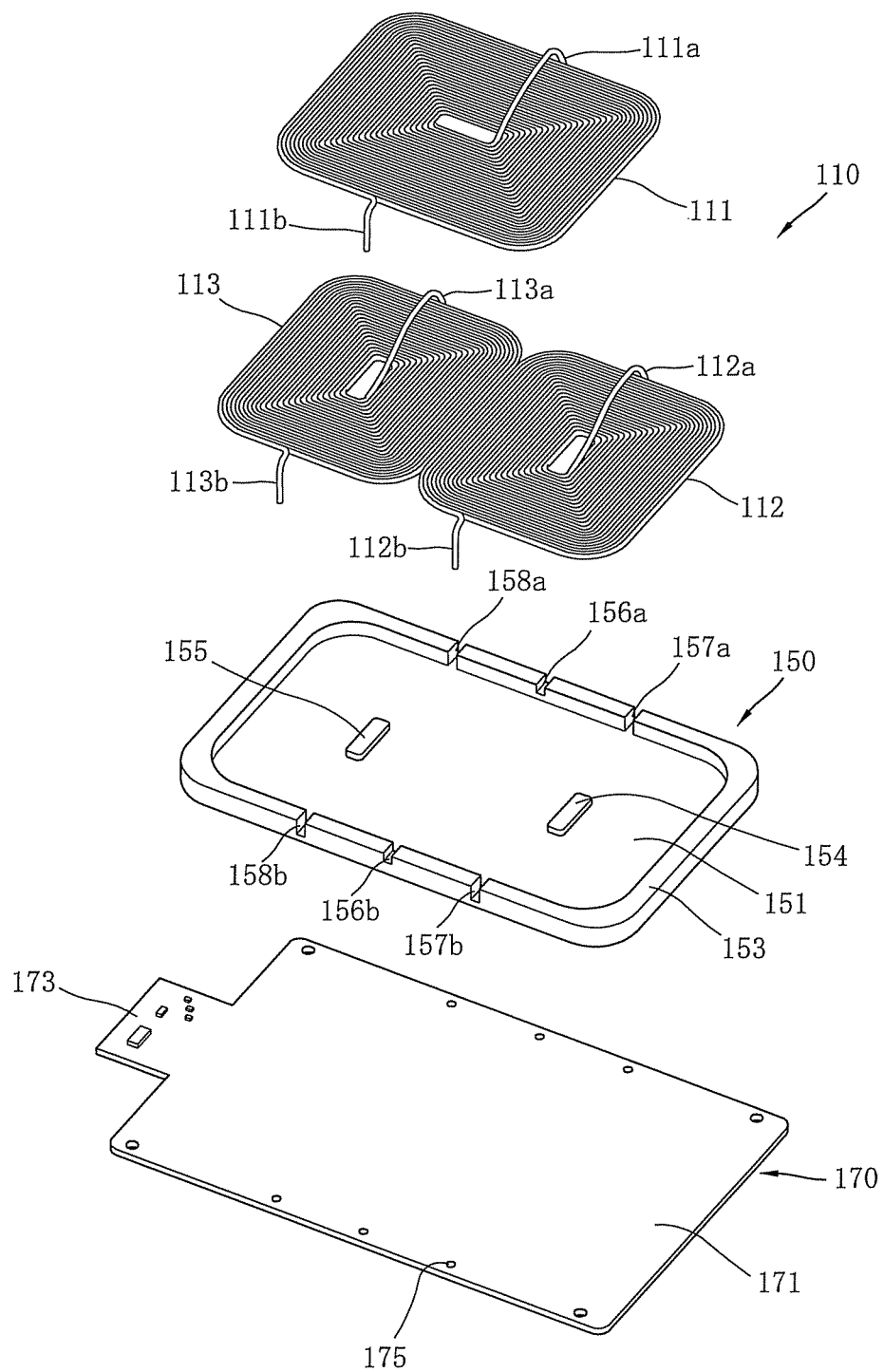
FIG. 3 is a disassembled perspective view showing the wireless power transmitting device 100 in FIG. 2.

A detailed configuration of the primary coil 110 and the core 150 will be described with reference to FIG. 3. FIG. 3 is a disassembled perspective view showing the wireless power transmitting device 100 in FIG. 2.

With reference to FIG. 3, the primary coil 110 includes the main coil 111 and the auxiliary coils including the sub coils 112 and 113, whose area is respectively different from the main coil 111, as described above. In this exemplary embodiment, the main coil 111 has a wider area than each of the first sub coil 112 and the second sub coil 113, and is disposed at an upper side than the sub coils 112 and 113.

The main coil 111 includes two end portions 111a and 111b, and the first sub coil 112 includes two end portions 112a and 112b. The second sub coil 113 also includes two end portions 113a and 113b.

A concave portion 151 for accommodating the primary coil 110 is formed at a main surface of the core 150. The concave portion 151 is defined by a side wall 153 protruded to surround the concave portion 151. A plurality of extension grooves 156a, 156b, 157a, 157b, 158a and 158b for communicating the concave portion 151 with an outside is formed at the side wall 153. Each of both end portions of the coils 111 to 113 extends to an outside of the concave portion 151 via the extension grooves 156a, 156b, 157a, 157b, 158a and 158b to be connected to the circuit board 170. The core 150 is formed of a magnetic substance. The core 150 shields a magnetic field, which is out of a direction toward the wireless power receiving device 200 (see FIG. 1), among the magnetic fields by a current flowing in the coil 110 accommodated in the concave portion 151.

The concave portion 151 is recessed to have a closed curve shape, i.e., a rectangular or oval shape outline. The concave portion 151 has a size for tightly accommodating an outer peripheral that holds the first sub coil 112 and the second sub coil 113 (and the main coil 111) disposed in parallel form together. Accordingly, since the first sub coil 112 and the second sub coil 113 are accommodated in the concave portion 151, the first sub coil 112 and the second sub coil 113 maintain a predetermined location inside the core 150.

The side wall 153 has a height corresponding to a depth that the concave portion 151 is recessed. The side wall 153 has a size corresponding to a thickness of the primary coil 110 to shield or lessen that the magnetic field generated in the coil 110 is leaked in a direction toward the side wall 153.

As described above, an inner surface of the side wall 153 contacts an outer peripheral of the tightly accommodated primary coil 110 such that the coil 110 is disposed at a regular (predetermined) position.

Supports 154 and 155 are formed to be protruded at a bottom of the concave portion 151. Each of the supports 154 and 155 is inserted into the hollow portion of the first sub coil 112 or is formed to be inserted into the hollow portion of the second sub coil 113. Accordingly, the supports 154 and 155 do not deviate from the position that the first sub coil 112 or the second sub coil 113 are set up, to thereby maintain the predetermined arrangement.

Shapes of the supports 154 and 155 are formed to correspond to the shapes of inner peripherals of the hollow portions of the coils 112 and 113. In this exemplary embodiment, the outer peripheral of the supports 154 and 155 has a curved section corresponding to the inner peripheral surface of the hollow portions having a curve shape. Differently from the first sub coil 112 and the second sub coil 113, a position of the main coil 111 may be determined according to a method that the main coil 111 is attached to the first sub coil 112 and the second sub coil 113 by using a double-sided tape.

Also, the plurality of extension grooves 156a, 156b, 157a, 157b, 158a and 158b for connecting the concave portion 151 to the outside is formed at the side wall 153. A first pair of extension grooves 156a and 156b are formed at a position corresponding to both end portions 111a and 111b of the main coil 111. A second pair of extension grooves 157a and 157b are formed at a position corresponding to both end portions 112a and 112b of the first sub coil 112. A third pair of extension grooves 158a and 158b are formed at a position corresponding to both end portions 113a and 113b of the second sub coil 113.

An upper surface 171 of the circuit board 170 is disposed to face a lower surface of the core 150. Through-holes 175 corresponding to the extension grooves 156a, 156b, 157a, 157b, 158a and 158b are formed along a long side of the circuit board 170. End portions of a primary core 110 passing through the through-holes 175 are connected to a circuit pattern of the circuit board 170 at a lower surface of the circuit board 170.

A relation of the main coil 111 and the first and second sub coils 112 and 113 will be described with reference to FIG. 4 and FIG. 5.

Figure 4:
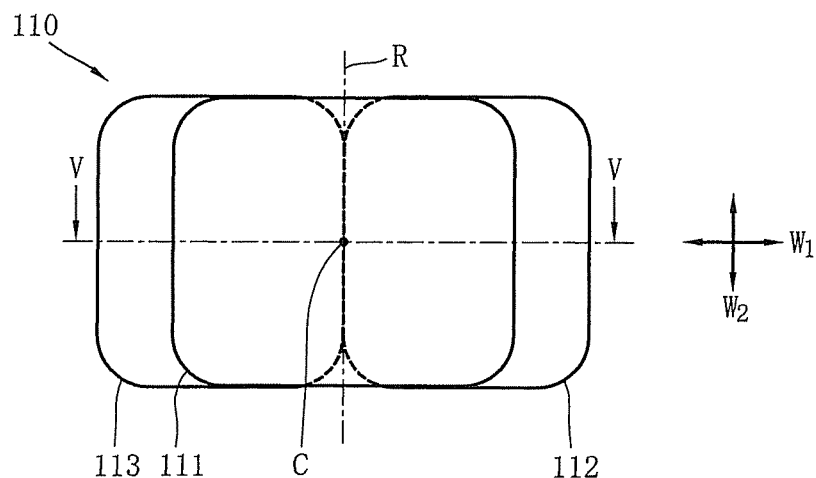
FIG. 4 is a conceptual plane view showing a primary coil 110 of FIG. 2.

FIG. 4 is a conceptual plane view showing the primary coil 110 of FIG. 2. FIG. 5 is a conceptual view including a cross-section taken along a line V-V of FIG. 4.

Figure 5:
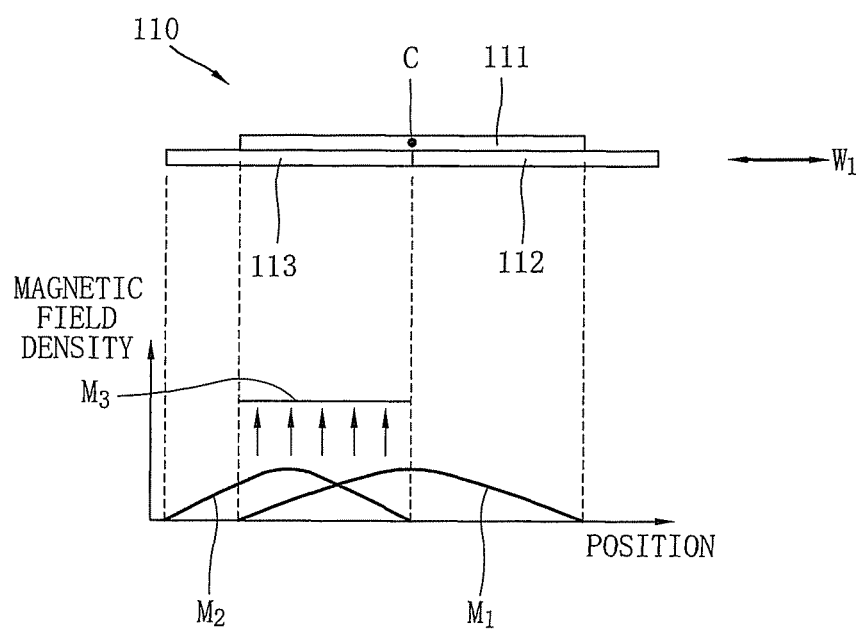
FIG. 5 is a conceptual view including a cross-section taken along a line V-V of FIG. 4.

Referring to FIG. 4 and FIG. 5, the main coil 111 has a width, which is longer than each width of the first sub coil 112 and the second sub coil 113 along the first direction $W_1$. However, the main coil 111 has the width, which is smaller than a sum of each width of the first sub coil 112 and the second sub coil 113 along the first direction $W_1$. Accordingly, a portion, which is out of the main coil 111 in each of the first sub coil 112 and the second sub coil 113, is exposed to the outside. The width of the main coil 111 in the direction $W_1$ may be 60-80% of the sum of the widths of the first sub coil 112 and the second sub coil 113. If the width of the main coil 111 is less than 50% of the sum of the widths of the first sub coil 112 and the second sub coil 113, it means that the width of the main coil 111 is smaller than that of any one of the first sub coil 112 and the second sub coil 113. Further, if the width of the main coil 111 is 100% of the sum of the widths of the first sub coil 112 and the second sub coil 113, it means that at least any one portion of the first sub coil 112 and the second sub coil 113 in the direction $W_1$ is not exposed to the outside. In the above two extreme cases, the present inventors recognized that the above ratio is proper when the main coil 111 mainly transmits a power signal to the wireless power receiving device 200 and the first sub coil 112 and the second sub coil 113 assist the main coil 111.

For example, if the width of the first sub coil 112 and the second sub coil 113 in the first direction $W_1$ is 50 mm, the width of the main coil 111 in the same direction may be 70 mm. In this case, a region corresponding to 35 mm in width of the first sub coil 112 and the second sub coil 113 in the first direction $W_1$ may be covered with the main coil 111, and a region corresponding to 15 mm in width of the first sub coil 112 and the second sub coil 113 in the first direction $W_1$ may be exposed to the outside. Differently from the above case, the coils 111 to 113 in a second direction $W_2$ may have the same width of 60 mm.

Differently from the difference of the widths in the first direction $W_1$, the width of the main coil 111 in the second direction $W_2$ may be the same as that of the first sub coil 112 and the second sub coil 113. Further, the first sub coil 112 and the second sub coil 113 may have the same size. Herein, the first direction $W_1$ is generally perpendicular to the second direction $W_2$ and each of the coils 111 to 113 generally has a quadrangular shape.

In addition, side surfaces facing the first sub coil 112 and the second sub coil 113 may meet at a line R, which passes a center C of the main coil 111.

According to the above configuration, since the main coil 111 is disposed at a center of the entire primary coil 110 to have the largest size, the main coil 111 may be set up as a basic (default) coil for transmitting a wireless power signal. When the user locates the wireless power receiving device 200 at a neighborhood of a center of a surface for charging of the wireless power transmitting device 100, it is charged by the main coil 111. When the wireless power receiving device 200 is out of the center of the charging surface, the first sub coil 112 or the second sub coil 113 operates to charge the wireless power receiving device 200.

Since both of the first sub coil 112 and the second sub coil 113 are disposed at a level, which is just below the main coil 111, both of the first sub coil 112 and the second sub coil 113 do not become more distant from the wireless power receiving device 200. Accordingly, it is possible to reduce that the power signal transmitting efficiency of the wireless power receiving device 200 is deteriorated by the coil, which is remarkably spaced apart from the wireless power receiving device 200.

With reference to FIG. 5, while the main coil 111 operates, at least one of the first sub coil 112 and the second sub coil 113 is operated by control of the transmitting controller 120 (see FIG. 1). Since magnetic fields generated in the cooperating coils reinforce each other, the wireless power receiving device 200 of FIG. 1 may receive a wireless power signal by a regular magnetic flux.

To be specific, FIG. 5 shows a case that the second sub coil 113 cooperates with the main coil 111. A magnetic field density M1 by the main coil 111 decreases from the center C of the main coil 111 to an end portion. A magnetic field density M2 by the second sub coil 113 also shows the similar aspect to the main coil 111. However, since the magnetic field by the main coil 111 and the magnetic field by the second sub coil 113 reinforce each other, a magnetic field density M3 of a higher level is satisfied in a portion related to the second sub coil 113 in the main coil 111.

In the wireless power transmitting device 100, since a current divided into halves is applied to each of the main coil 111 and the second sub coil 113, a power loss as well as a thermal stress of the main coil 111 and the second sub coil 113 are reduced.

Figure 6:
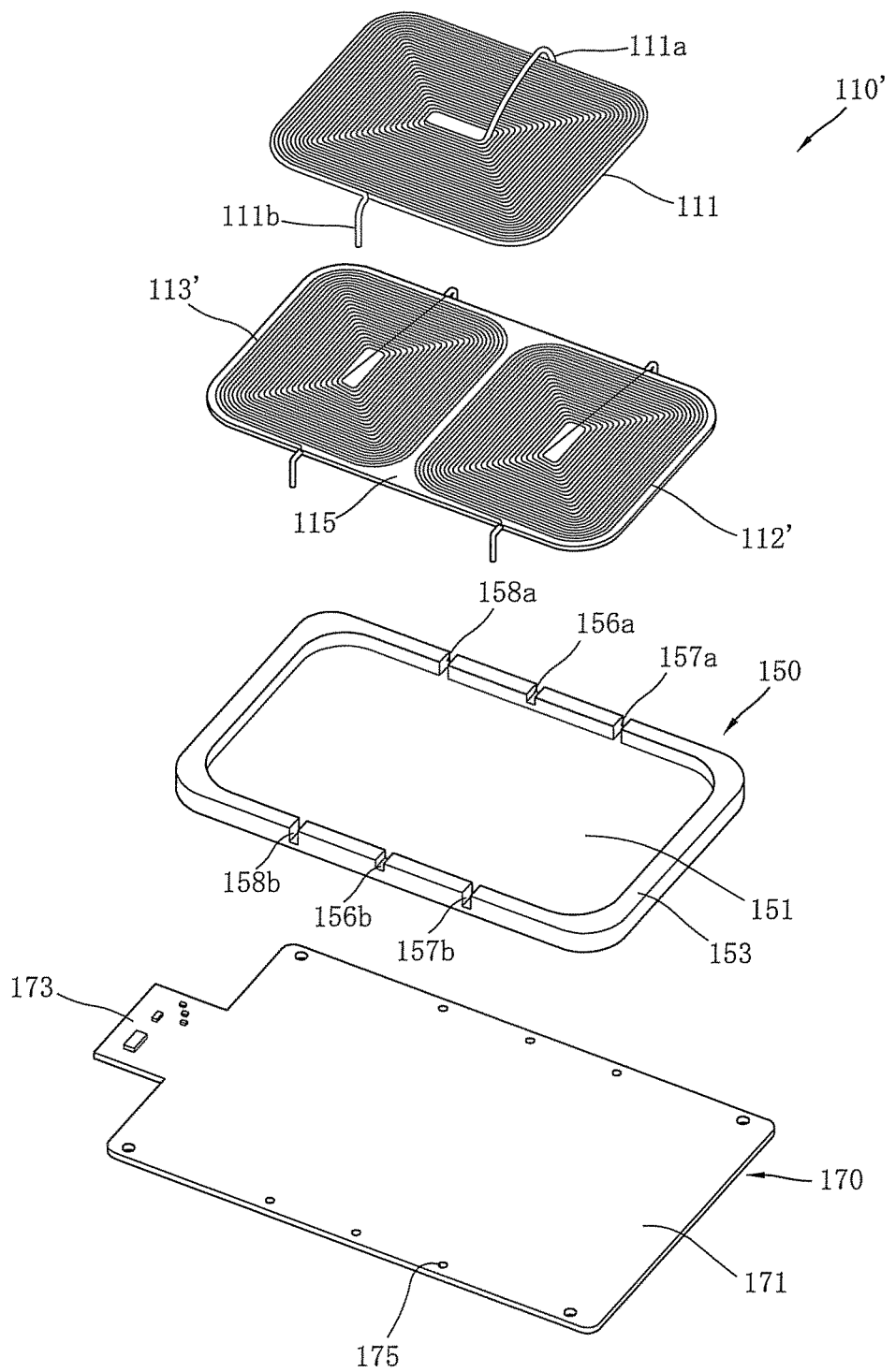
FIG. 6 is a disassembled perspective view showing a wireless power transmitting device 100' in accordance with an exemplary embodiment that the wireless power transmitting device 100 of FIG. 3 is modified.

Another configuration of the wireless power transmitting device 100 will be described with reference to FIG. 6. FIG. 6 is a disassembled perspective view showing a wireless power transmitting device 100' in accordance with an exemplary embodiment that the wireless power transmitting device 100 of FIG. 3 is modified.

With reference to FIG. 6, the wireless power transmitting device 100' in accordance with the modified exemplary embodiment is generally similar to the wireless power transmitting device 100 in accordance with the former exemplary embodiment. However, there is a difference that the first sub coil 112 and the second sub coil 113 in accordance with the former exemplary embodiment are formed in a different shape.

To be specific, a base 115 of an insulator is further included at a lower side of the main coil 111. Each of the first sub coil 112 and the second sub coil 113 in accordance with the former exemplary embodiment is formed of a first conductive pattern 112' and a second conductive pattern 113' formed on the base 115. In the first conductive pattern 112' and the second conductive pattern 113', a metal band extends in a spiral to form a plate shape. A conductive pattern indicates the whole of the first conductive pattern 112' and the second conductive pattern 113'.

The first conductive pattern 112' and the second conductive pattern 113' may be formed at a time via an etching process after attaching a metal plate such as a copper plate to the base 115. Since the first conductive pattern 112' and the second conductive pattern 113' form an auxiliary coil as one member by using the base 115 as a medium, a process for assembling the primary coil 110 may be simplified. Also, the core 150 does not need the supports 154 and 155 of FIG. 3.

Further, since the first conductive pattern 112' and the second conductive pattern 113' may be formed to be thinner than the first sub coil 112 and the second sub coil 113, a distance from a center of the first conductive pattern 112' and the second conductive pattern 113' in a thickness direction to the wireless power receiving device 200 is closer than that of the first sub coil 112 and the second sub coil 113 in accordance with the former exemplary embodiment. Accordingly, there is an advantage that a transmitting efficiency of the wireless power signal to the wireless power receiving device 200 is improved.

According to the core assembly for the wireless power transmitting device in accordance with the exemplary embodiment, and the wireless power transmitting device having the same, it is possible to increase a freedom degree of a correct position, in which the wireless power receiving device for receiving power from the wireless power transmitting device is to be disposed, by widening a rechargeable area via two sub coils disposed at different levels.

Also, since two sub coils are disposed at the same level, it is possible to minimize the deterioration of the power transmitting efficiency in the sub coil, which is far from the wireless power receiving device in comparison with the main coil, by minimizing the distance between two sub coils and the wireless power receiving device.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wireless power transmitting device, comprising:
 a main coil disposed at a first level;
 an auxiliary coil disposed at a lower side of the main coil such that the auxiliary coil is located at a second level, which is lower than the first level, and including a first sub coil and a second sub coil, which respectively have a portion overlapped with the main coil and respectively have a size smaller than the main coil in a first direction,
 wherein a width of the first sub coil and a width of the second sub coil in a second direction are the same as a width of the main coil in the second direction, and each of the first sub coil and the second sub coil are aligned to completely overlap with the main coil in the second direction;
 a core of a magnetic substance supporting the main coil and the auxiliary coil,
 wherein a side wall is formed on the core vertically for accommodating the main coil and the auxiliary coil in a space;
 a first support and a second support formed on at a bottom of the core, each of the first and second support inserted into a hollow portion of the first sub coil and the second sub coil respectively; and
 a transmitting controller including:
  an object detector configured to detect a secondary coil of a wireless power receiving device by detecting a load change of a primary coil, to determine whether an object detected by the load change is the wireless power receiving device by checking an identification (ID) signal is received, and
  a central controller configured to receive the determination result of the object detector, to transmit a power signal to a driver for transmitting the wireless power via the primary coil, to change the wireless power by controlling the driver based on a charging state signal if the charging state signal is received via the primary coil, and to selectively apply a power to at least one of the main coil and the auxiliary coil based on a detection result by the object detector,
 wherein the central controller is configured to apply the power to the main coil if the secondary coil is located within the area of the main coil,
 wherein the central controller is configured to apply the power to the main coil and the first sub coil if the secondary coil is partially overlapped with both the main coil and the first sub coil, and
 wherein the central controller is configured to apply the power to the main coil and the second sub coil if the secondary coil is partially overlapped with both the main coil and the second sub coil,
 wherein the first sub coil and the second sub coil are symmetric at a center of the main coil with respect to the second direction, which is perpendicular to the first direction,
 wherein an inner surface of the side wall contacts at least a portion of the auxiliary coil, and
 wherein the main coil contacts both the first sub coil and the second sub coil.

2. The wireless power transmitting device of claim 1, wherein the first sub coil and the second sub coil are disposed to contact a lower surface of the main coil.

3. The wireless power transmitting device of claim 1, wherein the width of the main coil in the first direction is shorter than a sum of the widths of the first sub coil and the second sub coil in the first direction.

4. The wireless power transmitting device of claim 3, wherein the width of the main coil in the first direction is 60% to 80% of the sum of the widths of the first sub coil and the second sub coil in the first direction.

5. The wireless power transmitting device of claim 1, wherein the width of the first sub coil in the first direction is configured to be the same as that of the second sub coil in the first direction.

6. The wireless power transmitting device of claim 5, wherein the first sub coil is disposed to contact the second sub coil.

7. The wireless power transmitting device of claim 1, wherein the auxiliary coil comprises:
 a base as an insulator disposed at the lower side of the main coil; and
 a conductive pattern disposed at a surface facing the main coil of the base to include a first conductive pattern forming the first sub coil and a second conductive pattern forming the second sub coil.

8. The wireless power transmitting device of claim 1, wherein a plurality of extension grooves, at which a passage that an end portion of the main coil and the auxiliary coil extends out of the concave portion is formed, are configured at the side wall.

9. A wireless power transmitting device, comprising:
a main coil disposed at a first level;
an auxiliary coil located at a second level, which is lower than the first level, and including a first sub coil and a second sub coil, which have a portion overlapped with the main coil,
wherein each of the first sub coil and the second sub coil has a width smaller than the main coil in a first axis, while a sum of the widths of the first sub coil and the second sub coil in the first axis is larger than the width of the main coil in the first axis;
a core of a magnetic substance supporting the main coil and the auxiliary coil,
wherein a side wall is formed on the core vertically for accommodating the main coil and the auxiliary coil in a space; and
a first support and a second support formed on the core,
wherein the first support and the second support are formed on the core such that the first sub coil and the second sub coil are inserted into hollow portions of the core respectively;
wherein at the center of the main coil, the first sub coil and the second sub coil are symmetric with respect to a second axis, which is perpendicular to the first axis,
wherein an inner surface of the side wall contacts at least a portion of the auxiliary coil, and
wherein the main coil contacts both the first sub coil and the second sub coil.

10. The wireless power transmitting device of claim 9, wherein each of the main coil, the first sub coil, and the second sub coil includes two end portions, and
wherein the side wall includes at least one extension groove which allows the end portions of the main coil, the first sub coil and the second sub coil to be extended out of the side wall.

11. The wireless power transmitting device of claim 9, further comprising:
a transmitting controller including:
an object detector configured to detect a secondary coil of a wireless power receiving device by detecting a load change of a primary coil, to determine whether an object detected by the load change is the wireless power receiving device by checking an identification (ID) signal is received, and
a central controller configured to receive the determination result of the object detector, to transmit a power signal to a driver for transmitting the wireless power via the primary coil, to change the wireless power by controlling the driver based on a charging state signal if the charging state signal is received via the primary coil, and to selectively apply a power to at least one of the main coil and the auxiliary coil based on a detection result by the object detector.

12. The wireless power transmitting device of claim 9, wherein the central controller is configured to apply the power to the main coil if the secondary coil is located within the area of the main coil, to apply the power to the main coil and the first sub coil if the secondary coil is partially overlapped with both the main coil and the first sub coil, and to apply the power to the main coil and the second sub coil if the secondary coil is partially overlapped with both the main coil and the second sub coil.

13. The wireless power transmitting device of claim 9, wherein the main coil is attached to the first sub coil and the second sub coil by an adhesive material.

14. The wireless power transmitting device of claim 9, wherein the width of the main coil in the first axis is substantially equal to 60% of the sum of the widths of the first sub coil and the second sub coil in the first axis.

* * * * *